UNITED STATES PATENT OFFICE.

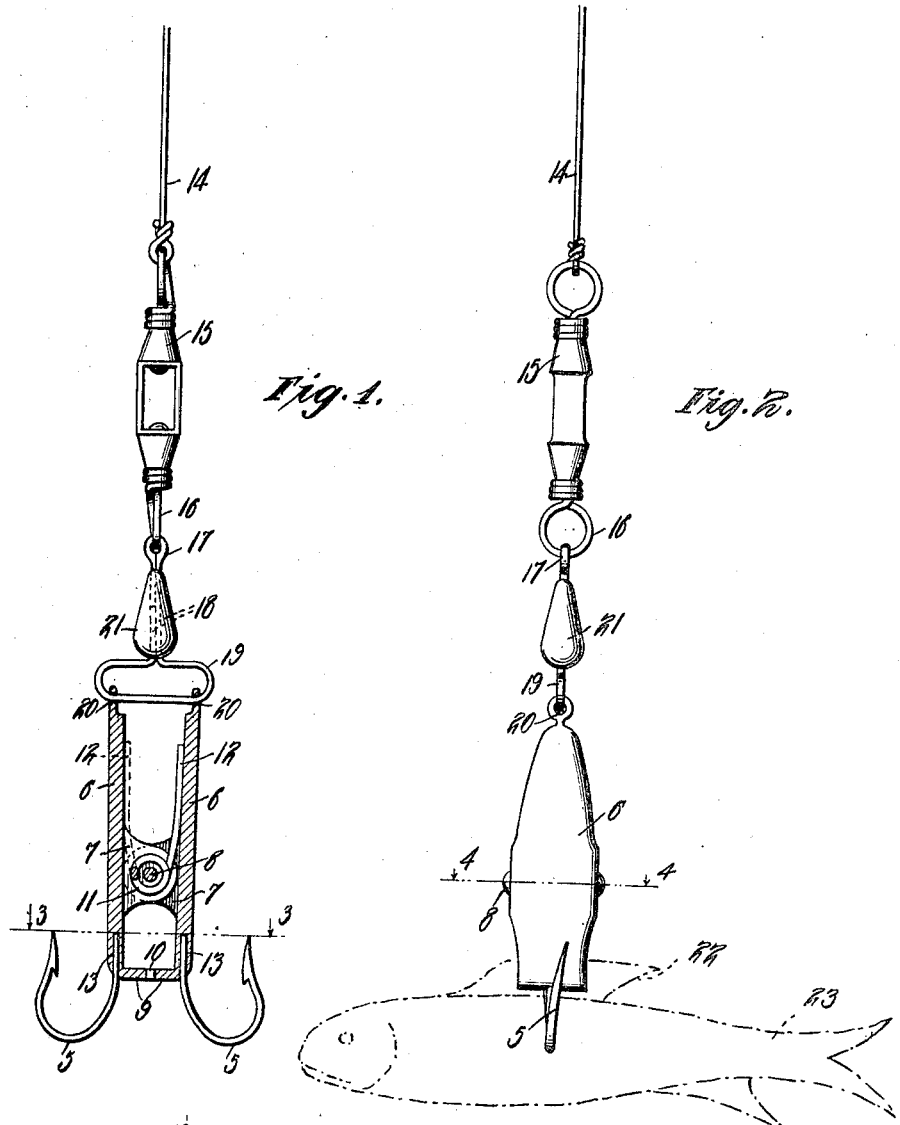

ALBERT R. DUTES, OF COLUMBIA, SOUTH CAROLINA, ASSIGNOR, BY DIRECT AND MESNE ASSIGNMENTS, OF ONE-HALF TO ROBERT W. GIBBES, OF COLUMBIA, SOUTH CAROLINA.

FISH BAITING AND CATCHING DEVICE.

1,324,109.   Specification of Letters Patent.   Patented Dec. 9, 1919.

Application filed May 29, 1916. Serial No. 100,653.

*To all whom it may concern:*

Be it known that I, ALBERT R. DUTES, a citizen of the Republic of France, residing at Columbia, in the county of Richland, and State of South Carolina, have invented certain new and useful Improvements in Fish Baiting and Catching Devices, of which the following is a specification.

My invention relates to a fish baiting and catching device.

An important object of the present invention is to provide a means associated with and additional to the hook or other fish-catching element to hold the bait adjacent the catching device, and particularly a means which will retain the bait, when live minnows or other fish, without torture or injury.

Another object is to provide in such a device, a means to clasp the back fin of a minnow or other bait fish.

Further I aim to provide an article of the nature set forth having relatively movable fin-clasping members, one or both of which are provided with catching elements, and a means whereby a fishing line may be connected to the clasping members without impairing relative movement thereof.

Still another object is to provide the novel means hereinafter set forth to serve as a weight as well as a fastening means for the ends of a link device for the clamp employed.

Also I aim to provide a device of the construction hereinafter set forth possessing the additional objects and advantages to be pointed out with relation thereto as the description progresses, and which is to be taken in connection with accompanying drawings.

In said drawings:—

Figure 1 is a view showing my improved device mostly in vertical section, and in connection with other fishing tackle shown in elevation;

Fig. 2 is a view in elevation of the parts shown in Fig. 1 but taken at a right angle thereto, and suggesting a captive fish;

Fig. 3 is a cross sectional view on the line 3—3 of Fig. 1, and

Fig. 4 is a cross sectional view on the line 4—4 of Fig. 2.

Referring specifically to the drawings wherein like reference characters designate like or similar parts throughout the views thereof, fish hooks 5 of usual construction are shown, each of which is carried by a clasp section or arm 6. Arms 6 have lugs 7 extending at an angle thereto and have registering eyes or openings through which a fastening and pivot pin 8 is passed and secured. At the lower ends, the sections 6 extend inwardly at 9 and each terminates in interfitting serrations or sharpened lugs at 10. The lugs or serrations 10 are normally urged into interengagement by means of a coil spring 11 which surrounds the pivot or rod 8 and which has arms 12 rising above the pivot and bearing against the interior of the section 6. The hooks 5 may be fastened to the section 6 in any suitable manner and may be clenched or soldered in openings 13 of the section as shown in Fig. 1.

The device described may be supported in any suitable manner from a fishing line as shown at 14. The line 14 however preferably connects to a conventional form of swivel 15 which is loosely connected by a ring 16 thereof with an eyelet 17 of a link device. The link device is preferably made from a single strand of wire bent so as to form the said eyelet 17, substantially parallel arms 18, and an open link proper 19 passing through enlarged openings 20 provided at the tops of the sections 6. The ends of the wire from which the link device is formed are secured together by a suitable solder at 21, and the solder is in excess of the required quantity and is formed into a sinker for the line 14.

In use, the sections 6 are spread against the tension of spring 11 by manual manipulation and are then applied in clasping relation with a back fin 22 of a bait fish as suggested at 23. Link 19 permits the movement of the clasp arms and the spring restores the serrations 10 into interengagement and engagement with the fin 22. With the bait thus attached, the article is placed in the water with the element 21 serving as a sinker. The captive bait fish is not tortured or injured by the means of its suspension and therefore will move in the water in the usual manner and its life will not be unduly shortened. While the invention has been primarily designed for use in connection with bait fish, yet it is to be understood that I may use other bait, for instance red flannel and that regardless of a particular kind of bait employed, it is held relatively close to the hook or catching element 5 so that it will be difficult for a fish to attack the bait without being caught in the usual manner by the hook.

Since merely one preferred embodiment has been illustrated and described, it is to be understood that changes in the details of construction may be resorted to without departing from the spirit and scope of the invention.

I claim:

1. A device of the class described having a plurality of bait clasping arms movable relatively to engage and hold the bait in a substantially horizontal position, suspending means including a link device, said device having an eyelet for connection with the remainder of the suspending means and having a link passing through the arms, said link being enlarged laterally whereby the arms move freely thereon, and said device having a joint intermediate the link and eyelet, and solder disposed around said joint and serving as a weight.

2. A device of the class described having a plurality of bait clasping arms movable relatively to engage and hold the bait in a substantially horizontal position, suspending means including a link device, said device having an eyelet for connection with the remainder of the suspending means and having a link passing through the arms, said link being enlarged laterally whereby the arms move freely thereon, and said device having a joint intermediate the link and eye, solder disposed around said joint and serving as a weight, and hook members having shanks, said shanks being embedded in the clasping arms and extending parallel to the longitudinal axis of the arms.

In testimony whereof I affix my signature in presence of two witnesses.

ALBERT R. DUTES.

Witnesses:
F. T. GRIMSLEY,
A. W. HOLMAN.